(12) United States Patent
Oura

(10) Patent No.: US 11,785,160 B2
(45) Date of Patent: Oct. 10, 2023

(54) IMAGE READING APPARATUS, ELECTRONIC DEVICE, AND CONTROL METHOD

(71) Applicant: PFU Limited, Ishikawa (JP)

(72) Inventor: Kyohei Oura, Ishikawa (JP)

(73) Assignee: PFU LIMITED, Ishikawa (JP)

(*) Notice: Subject to any disclaimer, the term of this patent is extended or adjusted under 35 U.S.C. 154(b) by 0 days.

(21) Appl. No.: 17/856,641

(22) Filed: Jul. 1, 2022

(65) Prior Publication Data

US 2023/0043359 A1    Feb. 9, 2023

(30) Foreign Application Priority Data

Aug. 6, 2021    (JP) ................... 2021-129673

(51) Int. Cl.
*H04N 1/028* (2006.01)
*H05B 47/105* (2020.01)
*H04N 1/031* (2006.01)

(52) U.S. Cl.
CPC ....... *H04N 1/02815* (2013.01); *H05B 47/105* (2020.01); *H04N 1/0315* (2013.01)

(58) Field of Classification Search
None
See application file for complete search history.

(56) References Cited

U.S. PATENT DOCUMENTS

| 2015/0249767 A1* | 9/2015 | Utsumi | H04N 1/00551 |
| | | | 358/1.14 |
| 2016/0276328 A1* | 9/2016 | Robin | H01L 33/0025 |
| 2020/0044471 A1* | 2/2020 | Shimizu | H04N 1/00907 |

FOREIGN PATENT DOCUMENTS

JP    2005-063998 A    3/2005

* cited by examiner

*Primary Examiner* — Lennin R Rodriguezgonzalez
(74) *Attorney, Agent, or Firm* — McDermott Will & Emery LLP

(57) ABSTRACT

In a scanner, a pulse generator generates a pulse signal, a transmissive optical sensor includes a light projector that projects pulsed light corresponding to the pulse signal and a light receiver disposed so as to face the light projector, a peak hold circuit holds a peak value of a voltage value indicating a light reception amount of the pulsed light in the light receiver, and a first current supply circuit increases a light projection amount of the pulsed light projected from the light projector by increasing a current supplied to the light projector when the peak value is smaller than a reference value and decreases the light projection amount of the pulsed light projected from the light projector by decreasing the current supplied to the light projector when the peak value is larger than the reference value.

4 Claims, 12 Drawing Sheets

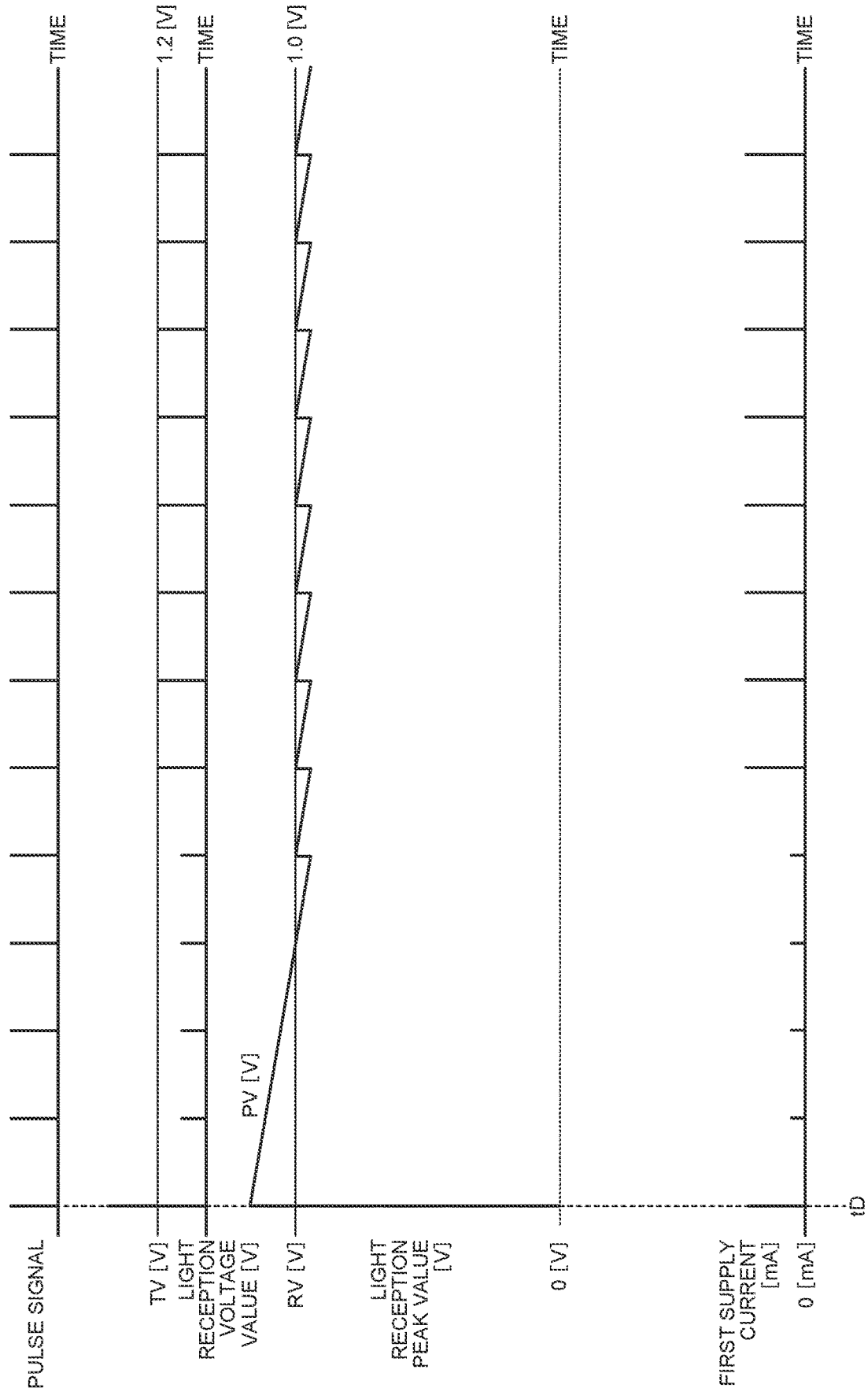

IMAGE READING APPARATUS, ELECTRONIC DEVICE, AND CONTROL METHOD

CROSS-REFERENCE TO RELATED APPLICATION

The present application claims priority to and incorporates by reference the entire contents of Japanese Patent Application. No. 2021-129673, filed on Aug. 6, 2021.

FIELD

The present disclosure relates to an image reading apparatus, an electronic device, and a control method.

BACKGROUND in some scanners, a medium to be read by the scanner (hereinafter also referred to as "reading target medium") is inserted into a conveyance path inside the scanner from an opening of the scanner. Moreover, among the scanners into which the reading target medium is inserted, there are scanners that determine whether or not a reading target medium has been inserted into a conveyance path by using an optical sensor. For example, in a case where a transmissive optical sensor is used for determination, the light projected from a light projector is blocked by a reading target medium. Therefore, when a central processing unit. (CPU) detects a decrease in the light reception amount by a light receiver, the CPU determines that the reading target medium has been inserted into the conveyance path, and the CPU starts rotation of conveyance rollers.

In addition, optical sensors of the same model number are usually mounted on scanners of the same model number. However, since optical sensors have product variations, even in a case where optical sensors of the same model number are mounted on scanners of the same model number, it may not be possible to accurately determine the insertion of a reading target medium into a conveyance path in a state where the light projection amount projected from a light projector is kept the same among a plurality of scanners.

Therefore, in each scanner, in order to set the light reception amount in a light receiver, in a state where no reading target medium is inserted in a conveyance path, to the same target value among a plurality of scanners, the light projection amount projected from a light projector is adjusted depending on the light reception amount in the light receiver (hereinafter also referred to as "adjustment of the light projection amount").

Example of related-art is described in Japanese Patent Application Laid-open No. 2005-063998.

However, since a CPU cannot operate unless power is supplied to the CPU, it is difficult for the CPU to adjust the light projection amount before the start of power supply to the CPU. On the other hand, if power is supplied to the CPU in advance before a reading target medium is inserted into a conveyance path in order to adjust the light projection amount by the CPU, the power consumption of the scanner increases.

Therefore, the present disclosure proposes technology capable of adjusting the light projection amount without using a CPU.

SUMMARY

According to an aspect of an embodiment, an image reading apparatus includes a conveyance path on which a medium to be read is conveyed, a generator that generates a pulse signal, a sensor comprising a light projector that projects pulsed light corresponding to the pulse signal toward the conveyance path and a light receiver disposed so as to face the light projector across the conveyance path, a peak hold circuit that holds a peak value of a voltage value indicating a light reception amount of the pulsed light in the light receiver, and a current supply circuit that performs light projection amount adjustment of increasing a light projection amount of the pulsed light projected from the light projector by increasing a current supplied to the light projector when the peak value is smaller than a reference value and decreasing the light projection amount by decreasing the current when the peak value is larger than the reference value.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

BRIEF DESCRIPTION OF DRAWINGS

FIG. 14 is a diagram for explaining an operation example of the scanner of the second embodiment of the disclosure.

DESCRIPTION OF EMBODIMENTS

Hereinafter, embodiments of the present disclosure will be described with reference to the drawings. In the following embodiments, the same configurations and steps for performing the same processing are denoted by the same symbols.

Hereinafter, a scanner will be described as an example of image reading apparatuses. However, image reading apparatuses to which the disclosed technology can be applied are not limited to scanners. For example, the disclosed technology can also be applied to image reading apparatuses other than scanners such as copiers. Furthermore, image reading apparatuses are an example of electronic devices, and electronic devices to which the disclosed technology can be applied are not limited to the image reading apparatuses.

Frist Embodiment

Configuration of Scanner

Figure 1:
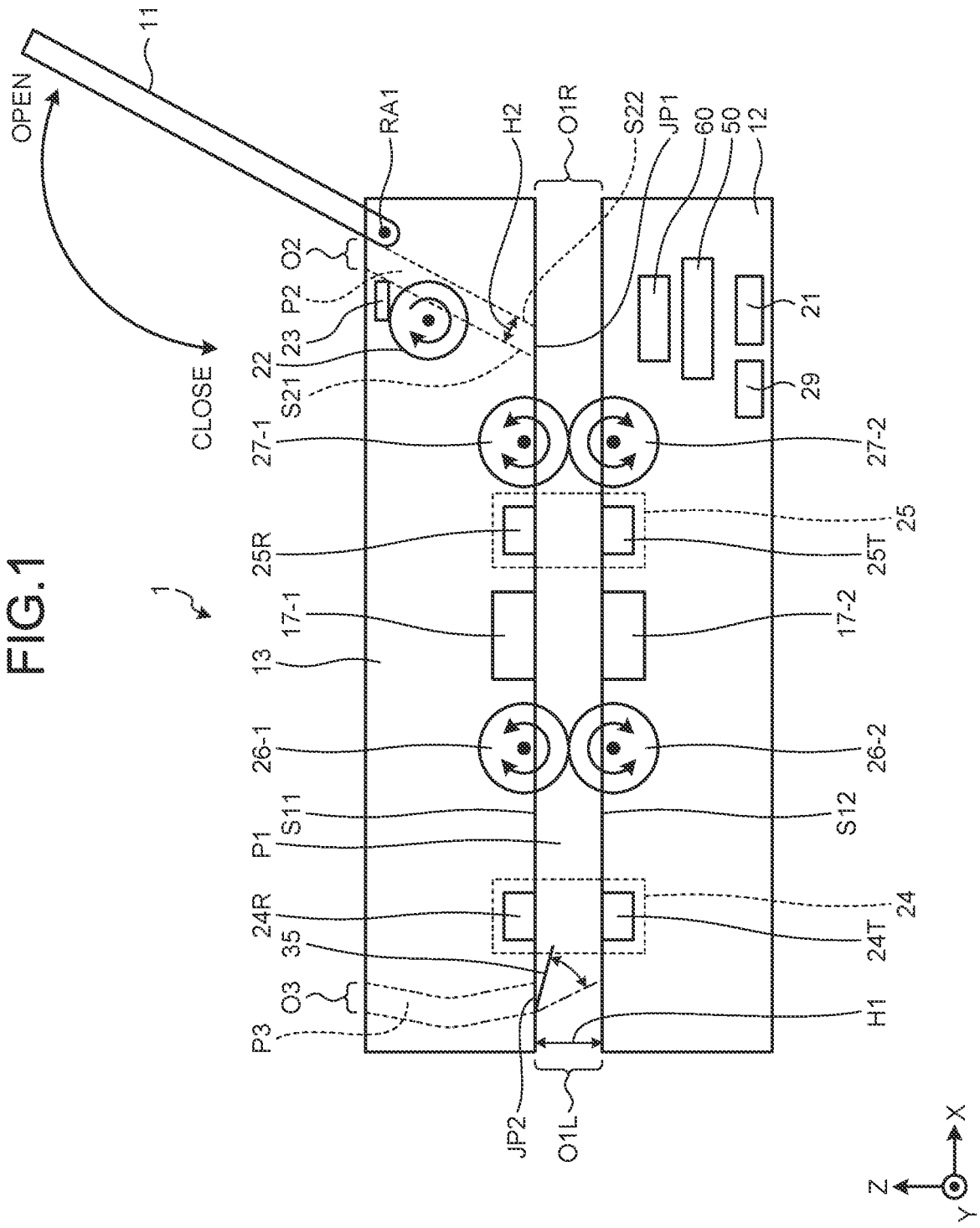
FIG. 1 is a diagram illustrating a configuration example of a scanner of a first embodiment of the present disclosure.
Figure 2:
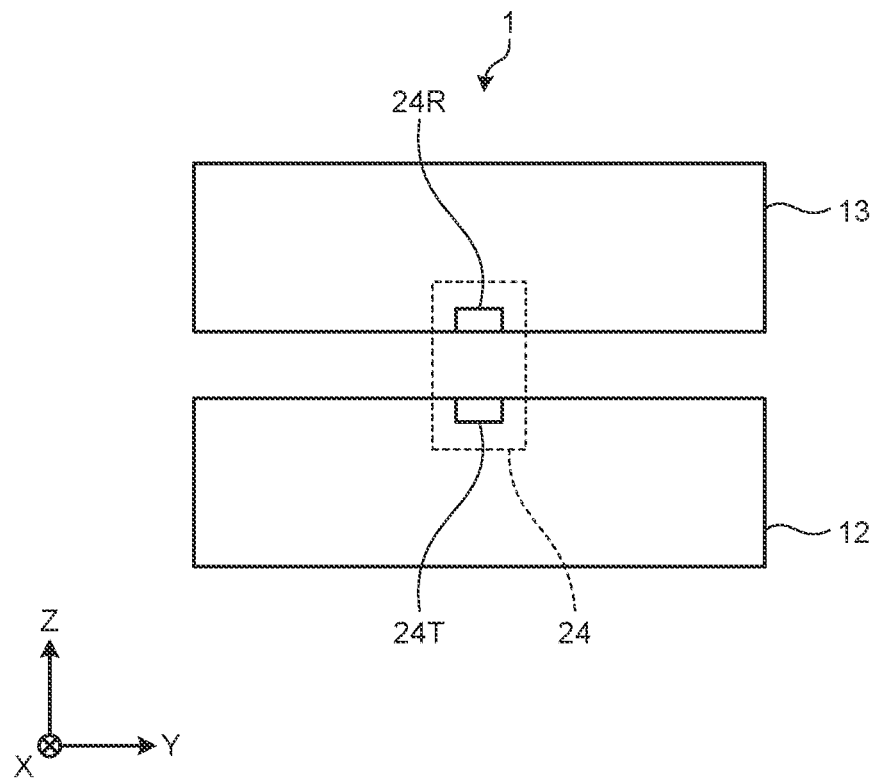
FIG. 2 is a diagram illustrating a configuration example of the scanner of the first embodiment of the disclosure.

FIGS. 1 and 2 are diagrams illustrating a configuration example of a scanner according to a first embodiment of the present disclosure. Illustrated in FIG. 1 is a side view, and illustrated in FIG. 2 is a front view. An example of a reading target medium inserted into a scanner 1 illustrated in FIGS. 1 and 2 includes a document on which characters or graphics are written or drawn.

In FIG. 1, the scanner 1 includes a feeding tray 11, a lower housing 12, and an upper housing 13. The feeding tray 11 attached to the upper housing 13 via a rotation shaft RA1 and can be opened and closed about the rotation shaft RA1. FIG. 1 is a diagram illustrating a state in which the feeding tray 11 is opened, and FIG. 2 is a diagram illustrating a state in which the feeding tray 11 is closed.

The scanner 1 further includes medium reading units 17-1 and 17-2, a CPU 21, a signal processor 50, a power supplier 60, a memory 29, a pickup roller 22, transmissive optical sensors 24 and 25, conveyance rollers 26-1, 26-2, 27-1, and 27-2, conveyance paths P1, P2, and P3, and a flap 35. The fulcrum of the flap 35 is formed in the upper housing 13. The fulcrum of the flap 35 is located at the rear end of the flap 35, and the initial position of the flap 35 is a state in which the tip of the flap 35 is raised closer to the upper housing 13. The pickup roller 22, the conveyance rollers 26-1, 26-2, 27-1, and 27-2, and the flap 35 are driven by motors (not illustrated).

The medium reading units 17-1 and 17-2 are implemented as hardware by, for example, an image sensor of a contact image sensor (CIS) type. Examples of the memory include a random access memory (RAM) such as a synchronous dynamic random access memory (SDRAM), a read only memory (ROM), and a flash memory.

The conveyance path P1 includes an opening O1L formed on a left side face of the scanner 1, an opening O1R formed on a right side face of the scanner 1, an upper face S11, and a lower face S12. The upper face S11 of the conveyance path P1 corresponds to a lower face of the upper housing 13, and the lower face S12 of the conveyance path P1 corresponds to an upper face of the lower housing 12. That is, the conveyance path P1 is formed between the upper housing 13 and the lower housing 12. The conveyance path P1 is used to convey a reading target medium inserted from the opening O1L (hereinafter also referred to as a "first reading target medium"). The first reading target medium is inserted from the opening O1L, normally, manually by an operator.

The conveyance path P2 includes an opening O2 formed in the upper face of the upper housing 13, an upper face S21, and a lower face S22. The conveyance path P2 is used to convey a reading target medium inserted from the opening O2 (hereinafter also referred to as a "second reading target medium"). The second reading target medium placed on the feeding tray 11 is inserted from the opening O2.

Here, the conveyance path P2 merges with the conveyance path P1 at a merging point JP1 located in the middle of the conveyance path P1. A width H1 in the height direction of the openings O1L and O1R of the conveyance path P1 (that is, a distance between the upper face S11 and the lower face S12) is larger than a width H2 in the height direction of the opening O2 of the conveyance path P2 (that is, the distance between the upper face S21 and the lower face S22). Since the width H1 is larger than the width H2, normally, a thick reading target medium is inserted into the opening O1L, and a thin reading target medium is inserted into the opening O2. That is, the first reading target medium is usually thicker than the second reading target medium.

The conveyance path P3 has an opening O3 formed on the upper face of the upper housing 13 and merges with the conveyance path P1 at a merging point JP2 located in the middle of the conveyance path P1.

The transmissive optical sensor 24 includes a light projector 24T and a light receiver 24R. The light projector 24T and the light receiver 24R are arranged so as to face each other across the conveyance path P1, and light projected from the light projector 24T toward the upper face S11 is received by the light receiver 24R. The light projector 24T is disposed on the lower face S12 side, and the light receiver 24R is disposed on the upper face S11 side. When the scanner 1 is in an "operation mode", the light projection amount of the light projected by the light projector 24T is kept constant at a first light projection amount QH under the control of the CPU 21. Meanwhile, when the scanner 1 is in a "sleep mode" in which the power consumption is smaller than that in the operation mode, the light projection amount of the light projected by the light projector 24T shifts between the first light projection amount QH and a second light projection amount QL that is smaller than the first light projection amount QH at every constant time T1 in accordance with a pulse signal output from the signal processor 50. The "sleep mode" may also be referred to as a "stand-by mode".

The transmissive optical sensor 25 includes a light projector 25T and a light receiver 25R. The light projector 25T and the light receiver 25R are arranged so as to face each other across the conveyance path P1, and light projected from the light projector 25T toward the upper face S11 is received by the light receiver 25R. The light projector 25T is disposed on the lower face S12 side, and the light receiver 25R is disposed on the upper face S11 side. When the scanner 1 is in the operation mode, the light projection amount of the light projected by the light projector 25T is kept constant at the first light projection amount QH under the control of the CPU 21. When the scanner 1 is in the sleep mode, the light projector 25T is turned off.

The scanner 1 does not include a "power button" for starting power supply to the CPU 21. The power supply from the power supplier 60 to the CPU 21 is started at the time when the feeding tray 11 in a closed state is opened by the operator of the scanner 1 or at the time when the first reading target medium is inserted from the opening O1L into the conveyance path P1 and the signal processor 50 determines that the first reading target medium is in the conveyance path P1. The CPU 21 becomes operable by being supplied with power from the power supplier 60. When the scanner 1 is in the sleep mode, power is not supplied to the CPU 21, and when the scanner 1 is in the operation mode, power is supplied to the CPU 21.

Conveyance of Second Reading Target Medium

Figure 3:
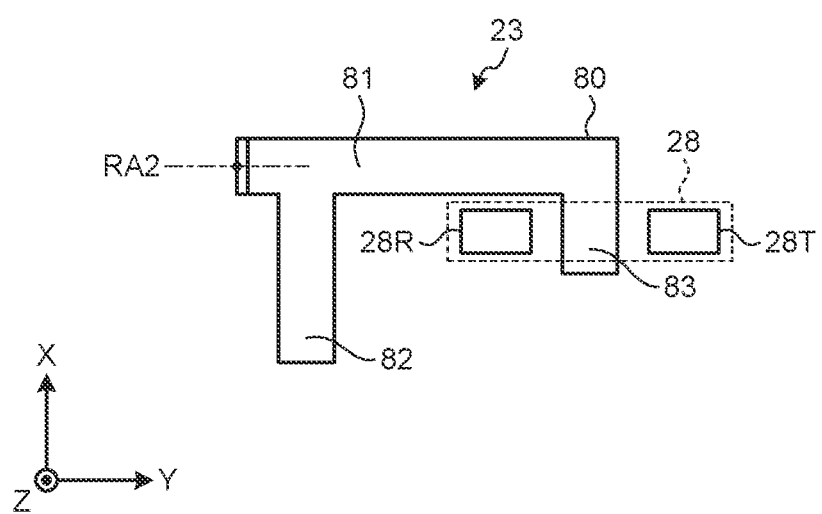
FIG. 3 is a diagram illustrating a configuration example of an emptiness sensor according to the first embodiment of the disclosure.
Figure 4:
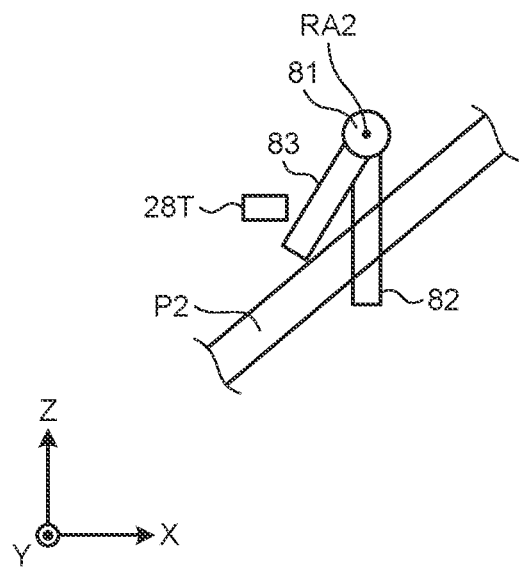
FIG. 4 is a diagram illustrating an operation example of the emptiness sensor according to the first embodiment of the disclosure.
Figure 5:
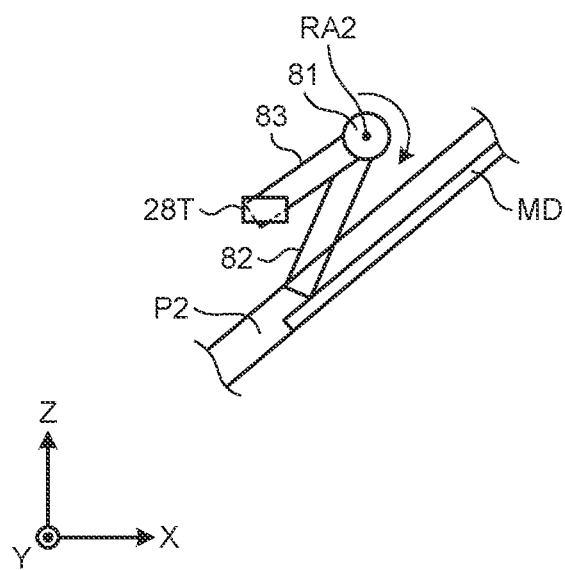
FIG. 5 is a diagram illustrating an operation example of the emptiness sensor according to the first embodiment of the disclosure.

FIG. 3 is a diagram illustrating a configuration example of an emptiness sensor according to the first embodiment of the disclosure. FIGS. 4 and 5 are diagrams illustrating an operation example of the emptiness sensor according to the first embodiment of the present disclosure.

In FIG. 3, an emptiness sensor 23 includes a transmissive optical sensor 28 and a movable member 80. The transmissive optical sensor 28 includes a light projector 28T and a light receiver 28R. The light projector 28T and the light receiver 28R are arranged so as to face each other, and the light projected from the light projector 28T is received by the light receiver 28R. The light projection amount of the light projected by the light projector 28T is kept constant at the first light projection amount QH under the control by the CPU 21. The movable member 80 includes an arm 81 and levers 82 and 83 coupled to the arm 81. The movable member 80 is rotatable about a rotation axis RA2.

When no second reading target medium is placed on the feeding tray 11, as illustrated in FIG. 4, since no second reading target medium is present on the conveyance path P2, the light projected from the light projector 28T is received by the light receiver 28R without being blocked by the lever 83.

At the time when the feeding tray 11 in the closed state is opened by the operator of the scanner 1, the signal processor 50 shifts the scanner 1 from the sleep mode to the operation mode and starts the power supply from the power supplier 60 to the CPU 21.

When the light reception amount in the light receiver 24R (hereinafter also referred to as a "first light reception amount") is equal to or larger than a threshold value THR, the CPU 21 and a controller 53 to be described later determine that the level of the first light reception amount (hereinafter also referred to as a "first light reception level") is at a high level H and determine that the first light reception level is at a low level L which is smaller than the high level H when the first light reception amount is less than the threshold value THR. The threshold value THR is stored in advance in the memory 29.

In addition, when the light reception amount in the light receiver 25R (hereinafter also referred to as a "second light reception amount") is equal to or larger than the threshold value THR, the CPU 21 determines that the level of the second light reception amount (hereinafter also referred to as a "second light reception level") is at the high level H and determines that the second light reception level is at the low level L when the second light reception amount is less than the threshold value THR.

Furthermore, when the light reception amount in the light receiver 28R (hereinafter, also referred to as a "third light reception amount") is equal to or larger than a threshold value TH1, the CPU 21 determines that the level of the third light reception amount (hereinafter, also referred to as a "third light reception level") is at the high level H and determines that the third light reception level is at the low level L when the third light reception amount is less than the threshold value TH1.

When a second reading target medium MD is placed on the feeding tray 11 as illustrated in FIG. 5 while the feeding tray 11 is in an opened state, the second reading target medium MD is inserted into the conveyance path P2 from the opening O2, and thus the lever 82 is pushed up by the second reading target medium MD. When the lever 82 is pushed up by the second reading target medium MD, the lever 83 moves from the position illustrated in FIG. 4 to the position illustrated in FIG. 5 as the movable member 80 rotates clockwise. As a result, the light projected from the light projector 28T is blocked by the lever 83, and thus the third light reception level decreases from the high level H to the low level L. At the time when the third light reception level decreases from the high level H to the low level L, the CPU 21 starts rotation of the pickup roller 22 and the conveyance rollers 26-1, 26-2, 27-1, and 27-2 and lowers the tip of the flap 35 toward the lower housing 12. The CPU 21 rotates the pickup roller 22 and the conveyance rollers 26-1 and 27-1 clockwise while rotating the conveyance rollers 26-2 and 27-2 counterclockwise. Furthermore, since the conveyance path P3 and the conveyance path P1 are connected with the tip of the flap 35 lowered toward the lower housing 12, a series of conveyance paths is formed by the conveyance path P2, the conveyance path P1, and the conveyance path P3.

When the leading end of the second reading target medium conveyed on the conveyance path P2 by the pickup roller 22 passes through the merging point JP1 and reaches a position between the conveyance roller 27-1 and the conveyance roller 27-2, the second reading target medium is conveyed on the conveyance path P1 in the −X direction (leftward direction in the drawing) by the conveyance rollers 27-1 and 27-2. When the second reading target medium is conveyed on the conveyance path P1 in the −X direction by the conveyance rollers 27-1 and 27-2 and the leading end of the second reading target medium reaches the transmissive optical sensor 25, the light projected from the light projector 25T is blocked by the second reading target medium, and thus the second light reception level decreases from the high level H to the low level L. At the time when the second light reception level decreases from the high level H to the low level L, the CPU 21 starts reading the second reading target medium by the medium reading units 17-1 and 17-2. Along with the conveyance of the second reading target medium in the −X direction on the conveyance path P1, the second reading target medium is read by the medium reading units 17-1 and 17-2. An upper surface of the second reading target medium is read by the medium reading unit 17-1, and a lower surface of the second reading target medium is read by the medium reading unit 17-2.

When the leading end of the second reading target medium reaches a position between the conveyance roller 26-1 and the conveyance roller 26-2 along with further conveyance of the second reading target medium in the −X direction on the conveyance path P1, the second reading target medium is further conveyed in the −X direction on the conveyance path P1 by the conveyance rollers 26-1 and 26-2. The leading end of the second reading target medium conveyed in the −X direction on the conveyance path P1 by the conveyance rollers 26-1 and 26-2 advances toward the merging point JP2 while being in contact with the upper face of the flap 35, as the second reading target medium is conveyed, and enters the conveyance path P3. Therefore, the second reading target medium having been read is conveyed in the +Z direction (upward direction in the drawing) on the conveyance path P3 and discharged from the opening O3 to the upper face of the upper housing 13.

At the time when the tail of a last second reading target medium placed on the feeding tray 11 passes through the emptiness sensor 23, the third light reception level increases from the low level L to the high level H. After a predetermined period of time has elapsed from the time when the third light reception level has once decreased from the high level H to the low level L and then increased again from the low level L to the high level H, the CPU 21 stops the rotation of the pickup roller 22 and the conveyance rollers 26-1, 26-2, 27-1, and 27-2.

Conveyance of First Reading Target Medium

In the sleep mode, when the first reading target medium is inserted into the conveyance path P1 in the +X direction (rightward direction in the drawing) from the opening O1L in a state where the tip of the flap 35 is raised closer to the upper housing 13, the light projected from the light projector 24T is blocked by the first reading target medium, and thus the first light reception level decreases from the high level H to the low level L. The signal processor 50 determines that the first reading target medium is present in the conveyance path P1 on the basis of the first light reception level as will be described later. At the time when it is determined that the first reading target medium is present on the conveyance path P1, the signal processor 50 shifts the scanner 1 from the sleep mode to the operation mode and starts power supply from the power supplier 60 to the CPU 21. The CPU 21 that has started the power supply starts to rotate the conveyance rollers 26-1 and 27-1 counterclockwise while starting to rotate the conveyance rollers 26-2 and 27-2 clockwise. When the first reading target medium is further inserted in the +X direction and the leading end of the first reading target medium reaches a position between the conveyance roller 26-1 and the conveyance roller 26-2, the first reading target medium is conveyed on the conveyance path P1 in the +X direction by the conveyance rollers 26-1 and 26-2.

When the first reading target medium is conveyed in the +X direction by the conveyance rollers 26-1 and 26-2 and the leading end of the first reading target medium reaches the transmissive optical sensor 25, the light projected from the light projector 25T is blocked by the first reading target medium, and thus the second light reception level decreases from the high level H to the low level L. At the time when the second light reception level decreases from the high level H to the low level L, the CPU 21 temporarily stops the rotation of the conveyance rollers 26-1, 26-2, 27-1, and 27-2.

After the rotation of the conveyance rollers 26-1, 26-2, 27-1, and 27-2 is temporarily stopped, when a "scan start button" (not illustrated) included in the scanner 1 is pressed down by the operator, the CPU 21 starts to rotate the conveyance rollers 26-1 and 27-1 counterclockwise again while starting to rotate the conveyance rollers 26-2 and 27-2 clockwise. When the first reading target medium is further conveyed in the +X direction on the conveyance path P1 by the conveyance rollers 26-1 and 26-2 and the leading end of the first reading target medium reaches a position between the conveyance roller 27-1 and the conveyance roller 27-2, the first reading target medium is further conveyed in the +X direction on the conveyance path P1 by the conveyance rollers 27-1 and 27-2.

Then, at the time when the rear end of the first reading target medium passes the transmissive optical sensor 25, the light projected from the light projector 25T is received by the light receiver 25R, and thus the second light reception level increases from the low level L to the high level H. At the time when the second light reception level temporarily has decreased from the high level H to the low level L along with the conveyance of the first reading target medium in the +X direction on the conveyance path P1 and then increased again from the low level L to the high level H, the CPU 21 reverses the rotation directions of the conveyance rollers 26-1, 26-2, 27-1, and 27-2 and rotates the conveyance rollers 26-1 and 27-1 clockwise while rotating the conveyance rollers 26-2 and 27-2 counterclockwise. As a result, the conveyance direction of the first reading target medium on the conveyance path P1 is reversed from the +X direction to the −X direction. When the tail of the reading target medium reaches the transmissive optical sensor 25 as the conveyance direction of the first reading target medium is reversed from the +X direction to the −X direction, the light projected from the light projector 25T is blocked by the first reading target medium, and thus the second light reception level decreases from the high level H to the low level L.

The CPU 21 starts reading the first reading target medium by the medium reading units 17-1 and 17-2 at the time when the conveyance direction of the first reading target medium is reversed from the +X direction to the −X direction. Along with the conveyance of the first reading target medium in the −X direction on the conveyance path P1, the first reading target medium is read by the medium reading units 17-1 and 17-2. The upper surface of the first reading target medium is read by the medium reading unit 17-1, and the lower surface of the first reading target medium is read by the medium reading unit 17-2. The first reading target medium having been read is discharged from the opening O1L.

At the time when the leading end of the first reading target medium passes the transmissive optical sensor 25 along with the conveyance of the first reading target medium in the −X direction, the light projected from the light projector 25T is received by the light receiver 25R, and thus the second light reception level increases from the low level L to the high level H. After a lapse of a predetermined period of time from the time when the second light reception level has temporarily decreased from the high level H to the low level L along with the conveyance of the first reading target medium in the −X direction on the conveyance path P1 and then increased again from the low level L to the high level H, the CPU 21 stops the rotation of the conveyance rollers 26-1, 26-2, 27-1, and 27-2.

Configuration of Signal Processor

Figure 6:
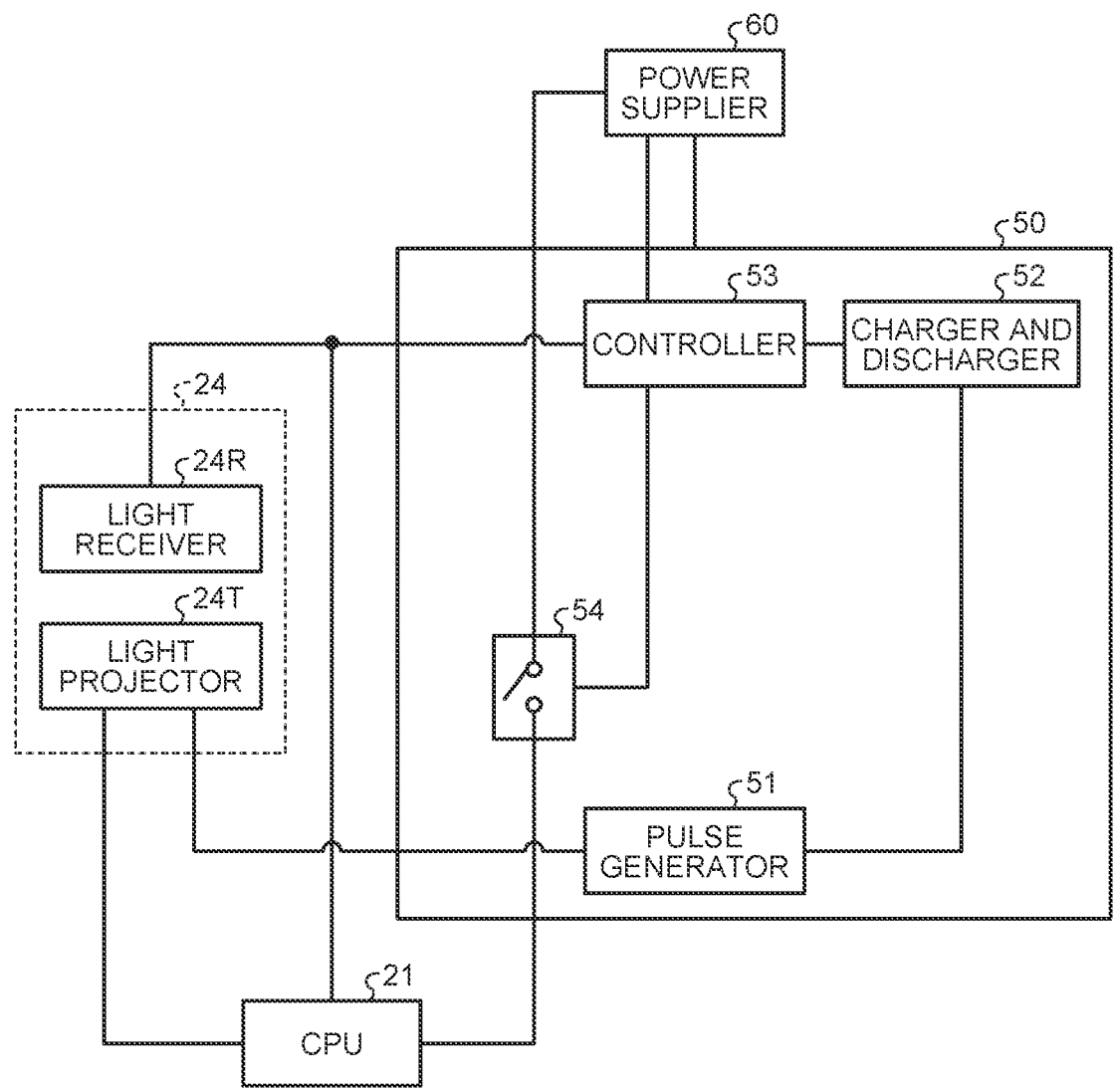
FIG. 6 is a diagram illustrating a configuration example of a signal processor according to the first embodiment of the disclosure.

FIG. 6 is a diagram illustrating a configuration example of the signal processor according to the first embodiment of the present disclosure. In FIG. 6, the signal processor 50 includes a pulse generator 51, a charger and discharger 52, a controller 53, and a switch 54. The charger and discharger 52 has a capacitor (not illustrated) capable of accumulating charges and releasing the accumulated charges. Examples of the controller 53 include processors such as a digital signal processor (DSP) and a field programmable gate array (FPGA).

Power is supplied from the power supplier 60 to the signal processor 50 when the scanner 1 is in the sleep mode. In addition, when the scanner 1 is in the operation mode, power is supplied from the power supplier 60 to the CPU 21 via the switch 54. The power consumption of the scanner 1 when the scanner 1 is in the sleep mode is, for example, about 0.3 W, and the power consumption of the scanner 1 when the scanner 1 is in the operation mode is, for example, about 9 W.

Processing Procedure in Scanner

Figure 7:
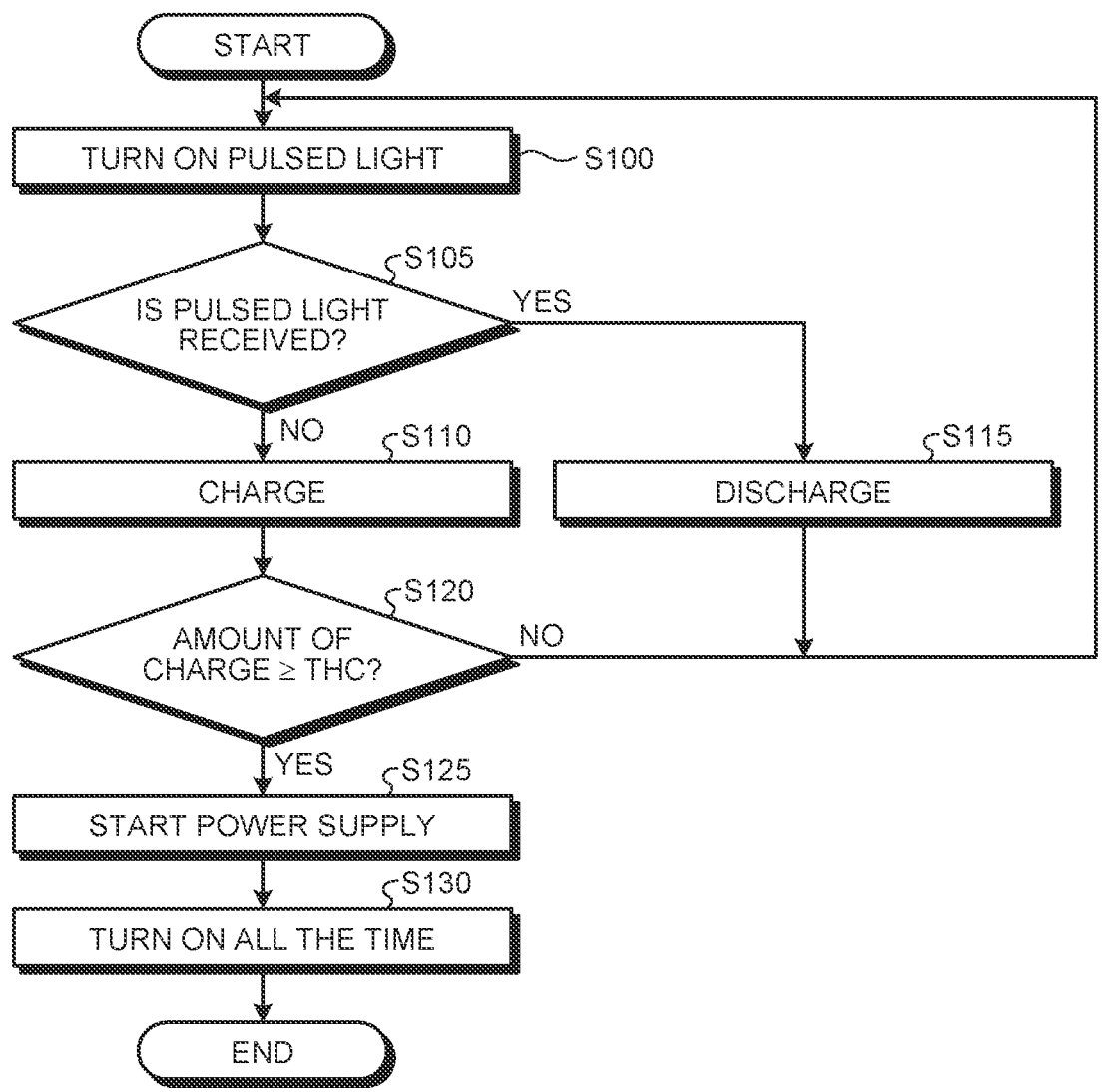
FIG. 7 is a flowchart illustrating an example of a processing procedure in the scanner of the first embodiment of the disclosure.

FIG. 7 is a flowchart illustrating an example of a processing procedure performed by the scanner of the first embodiment of the disclosure. The flowchart illustrated in FIG. 7 is started when the scanner 1 is in the sleep mode. At the start of the flowchart illustrated in FIG. 7, the switch 54 is turned off, and no power is supplied from the power supplier 60 to the CPU 21.

In step S100, the pulse generator 51 generates a pulse signal and outputs the generated pulse signal to the light projector 24T and the charger and discharger 52, and the light projector 24T performs pulsed lighting in accordance with the pulse signal input thereto. For example, the pulse generator 51 generates a rectangular wave pulse signal having a duty ratio of 50%, and the light projector 24T projects, toward the conveyance path P1, light of which light projection amount shifts between the first light projection amount QH and the second light projection amount QL every constant time T1 (hereinafter also referred to as "pulsed light") in accordance with the pulse signal.

Next, in step S105, the controller 53 determines whether or not pulsed light is received by the light receiver 24R. For example, the controller 53 determines that the pulsed light is received by the light receiver 24R when there is a time during which the first light reception level becomes the high level H during a time T1 and determines that the pulsed light is not received by the light receiver 24R when the first light reception level continues to be at the low level L for a time T1. If the pulsed light is not received by the light receiver 24R (step S105: No), the processing proceeds to step S110, and if the pulsed light is received by the light receiver 24R (step S105: Yes), the processing proceeds to step S115.

In step S110, the controller 53 charges the charger and discharger 52. That is, in step S110, the controller 53 controls the charger and discharger 52 so that the charge of the pulse signal output from the pulse generator 51 to the charger and discharger 52 is accumulated in the capacitor. After the processing of step S110, the processing proceeds to step S120.

On the other hand, in step S115, the controller 53 causes the charger and discharger 52 to discharge electricity. That is, in step S115, the controller 53 controls the charger and discharger 52 so as to discharge, from the capacitor, the charge accumulated in the capacitor. After the processing of step S115, the processing returns to step S100.

In step S120, the controller 53 determines whether or not the amount of charge in the charger and discharger 52, that is, the amount of charge accumulated in the capacitor included in the charger and discharger 52 is equal to or larger than a threshold value THC. If the amount of charge is equal to or larger than the threshold value THC (step S120: Yes), the controller 53 determines that a first reading target medium is present in the conveyance path P1, and the processing proceeds to step S125. On the other hand, if the amount of charge is less than the threshold value THC (step S120: No), the controller 53 determines that no first reading target medium is present in the conveyance path P1, and the processing returns to step S100.

In step S125, the controller 53 turns on the switch 54, which has been turned off, to start power supply from the power supplier 60 to the CPU 21.

Next, in step S130, the CPU 21 to which the power supply has been started in step S125 keeps the light projection amount of the light projected by the light projector 24T constant at the first light projection amount QH, thereby causing the light projector 24T to be on all the time. After the processing of step S130, the processing procedure ends.

Operation of Scanner

Figure 8:
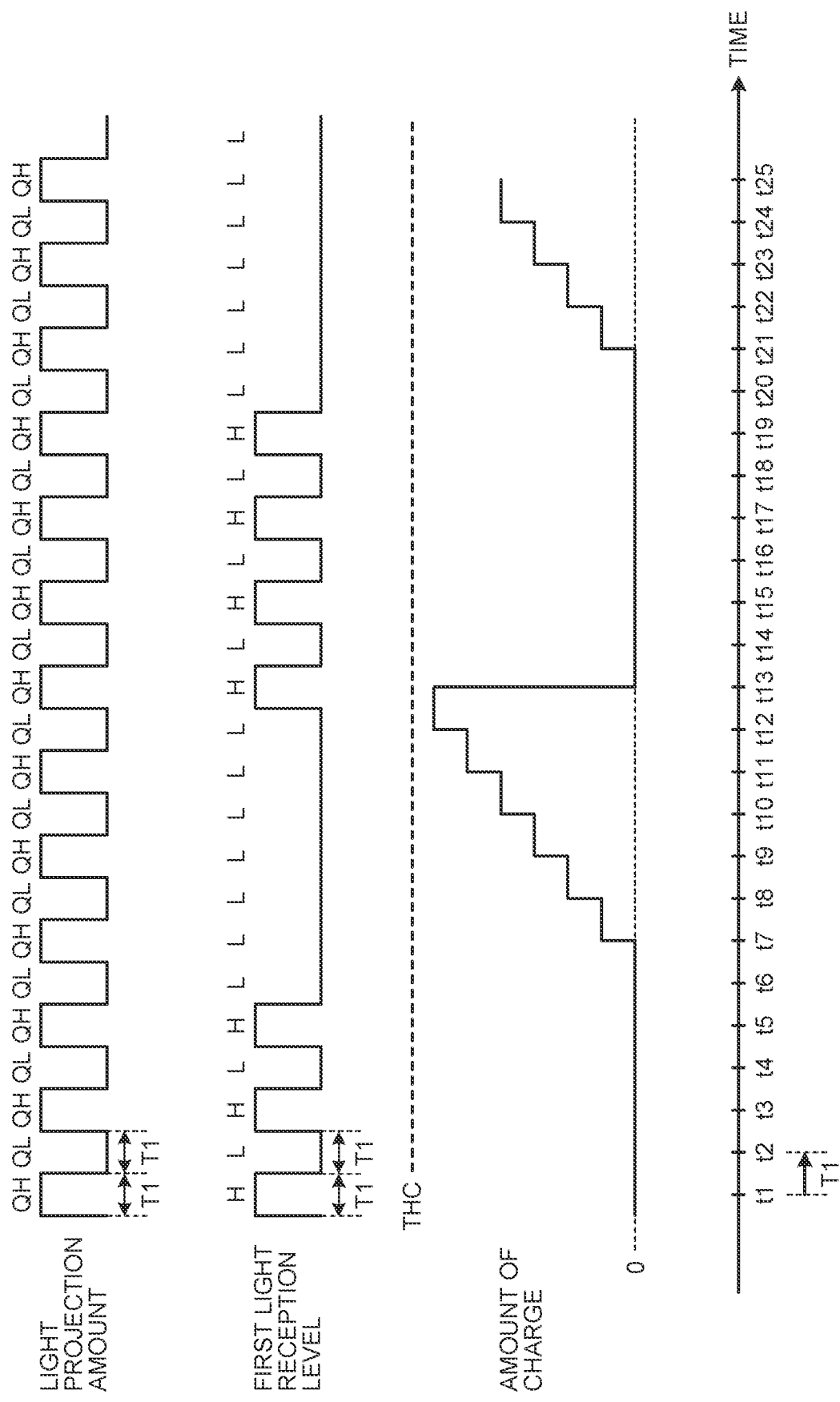
FIG. 8 is a diagram for explaining an operation example of the scanner of the first embodiment of the disclosure.
Figure 9:
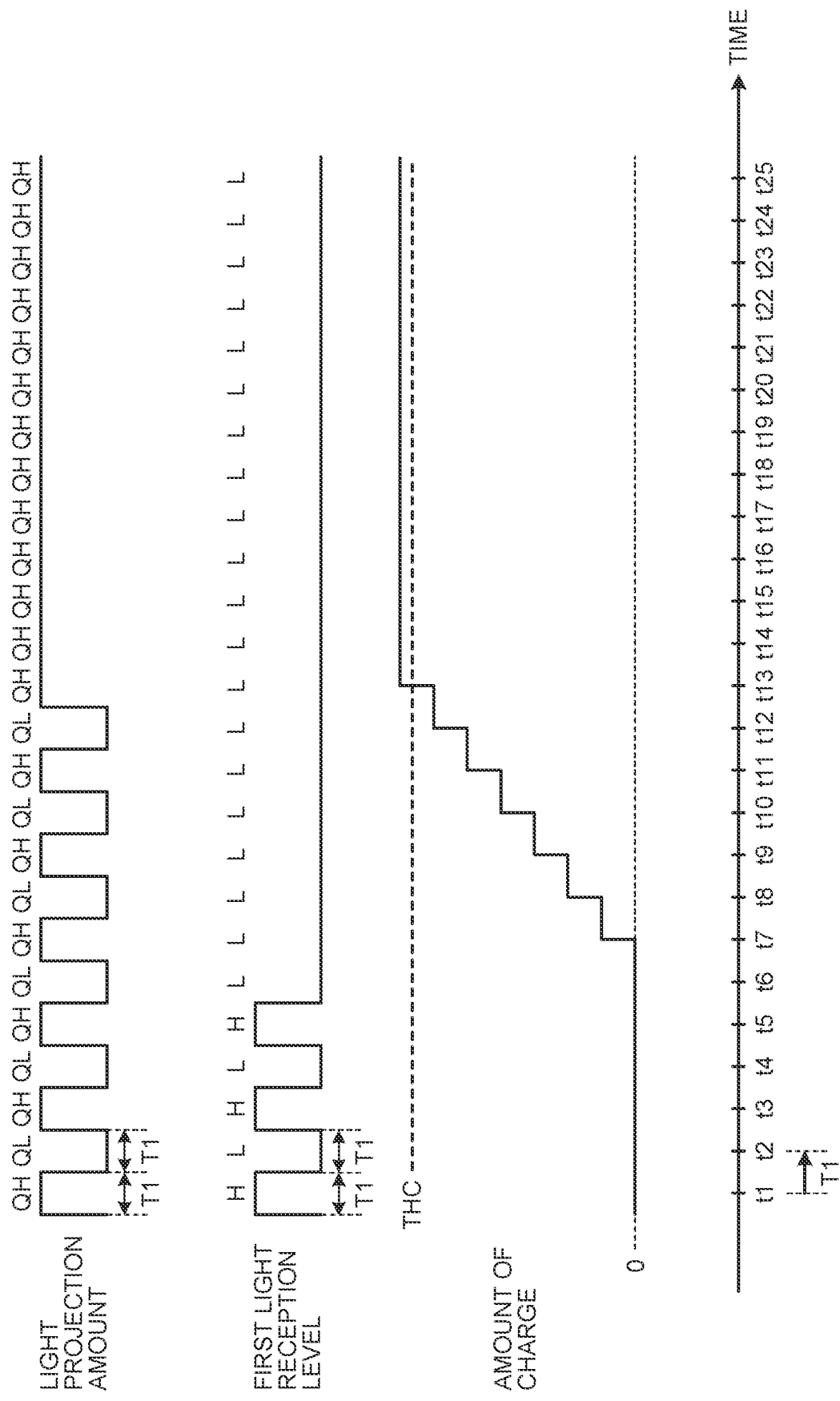
FIG. 9 is a diagram for explaining an operation example of the scanner of the first embodiment of the disclosure.

FIGS. 8 and 9 are diagrams for explaining an operation example of the scanner of the first embodiment of the present disclosure. Illustrated in FIG. 8 is a case where the pulsed light is received by the light receiver 24R before the amount of charge in the charger and discharger 52 reaches the threshold value THC (hereinafter also referred to as "case C1"), and illustrated in FIG. 9 is a case where the amount of charge in the charger and discharger 52 becomes equal to or larger than the threshold value THC (hereinafter also referred to as "case C2"). Hereinafter, an operation example of the scanner 1 will be described separately for case C1 and case C2. In any of the cases C1 and C2, the determinations in steps S105 and S120 (FIG. 7) are performed at each of timing t1 to t25, an interval between each timing being a constant interval T1.

Case C1 (FIG. 8)

In FIG. 8, at each of timing t1 to t6, since there is a time during which the first light reception level becomes the high level H during a time T1, the controller 53 determines that the light receiver 24R receives the pulsed light (step S105: Yes) and causes the charger and discharger 52 to discharge electricity (step S115).

In the time T1 from timing t6 to timing t7, there is no time during which the first light reception level becomes the high level H, and the first light reception level continues to be at the low level L for the time T1. Therefore, at the timing t7, the controller 53 determines that the light receiver 24R does not receive the pulsed light (step S105: No) and charges the charger and discharger 52 (step S110). Similarly, also at each of timing t8 to t12, the controller 53 determines that the light receiver 24R does not receive the pulsed light (step S105: No) and charges the charger and discharger 52 (step S110). Meanwhile, since the amount of charge in the charger and discharger 52 is less than the threshold value THC at each of the timing t7 to t12 (step S120: No), the processing returns from step S120 to step S100.

Since there is a time during which the first light reception level becomes the high level H in the time T1 from the timing t12 to timing L13, the controller 53 determines that the light receiver 24R receives the pulsed light at the timing t13 (step S105: Yes) and causes the charger and discharger 52 to discharge electricity (step S115).

Then, the operation at timing t14 to t20 is similar to the operation at timing t1 to t6, and the operation at timing t21 to t25 is similar to the operation at timing t7 to t12.

Case C2 (FIG. 9)

In FIG. 9, at each of timing t1 to t6, since there is a time during which the first light reception level becomes the high level H during a time T1, the controller 53 determines that the light receiver 24R receives the pulsed light (step S105: Yes) and causes the charger and discharger 52 to discharge electricity (step S115).

In the time T1 from timing t6 to timing t7, there is no time during which the first light reception level becomes the high level H, and the first light reception level continues to be at the low level L for the time T1. Therefore, at the timing t7, the controller 53 determines that the light receiver 24R does not receive the pulsed light (step S105: No) and charges the charger and discharger 52 (step S110). Similarly, also at each of timing t8 to t13, the controller 53 determines that the light receiver 24R does not receive the pulsed light (step S105: No) and charges the charger and discharger 52 (step S110). As a result, since the amount of charge of the charger and discharger 52 becomes equal to or larger than the threshold value THC at the timing t13 (step S120: Yes), the controller 53 determines that the first reading target medium is present in the conveyance path P1 and starts the power supply from the power supplier 60 to the CPU 21 at the timing t13 (step S125). Furthermore, the CPU 21 to which the power supply has been started at the timing t13 keeps the light projection amount of the light projector 24T constant at the first light projection amount QH at and after the timing t13, thereby causing the light projector 24T to be on all the time.

The above is the description of the first embodiment.

Second Embodiment

Configuration of Scanner

Figure 10:
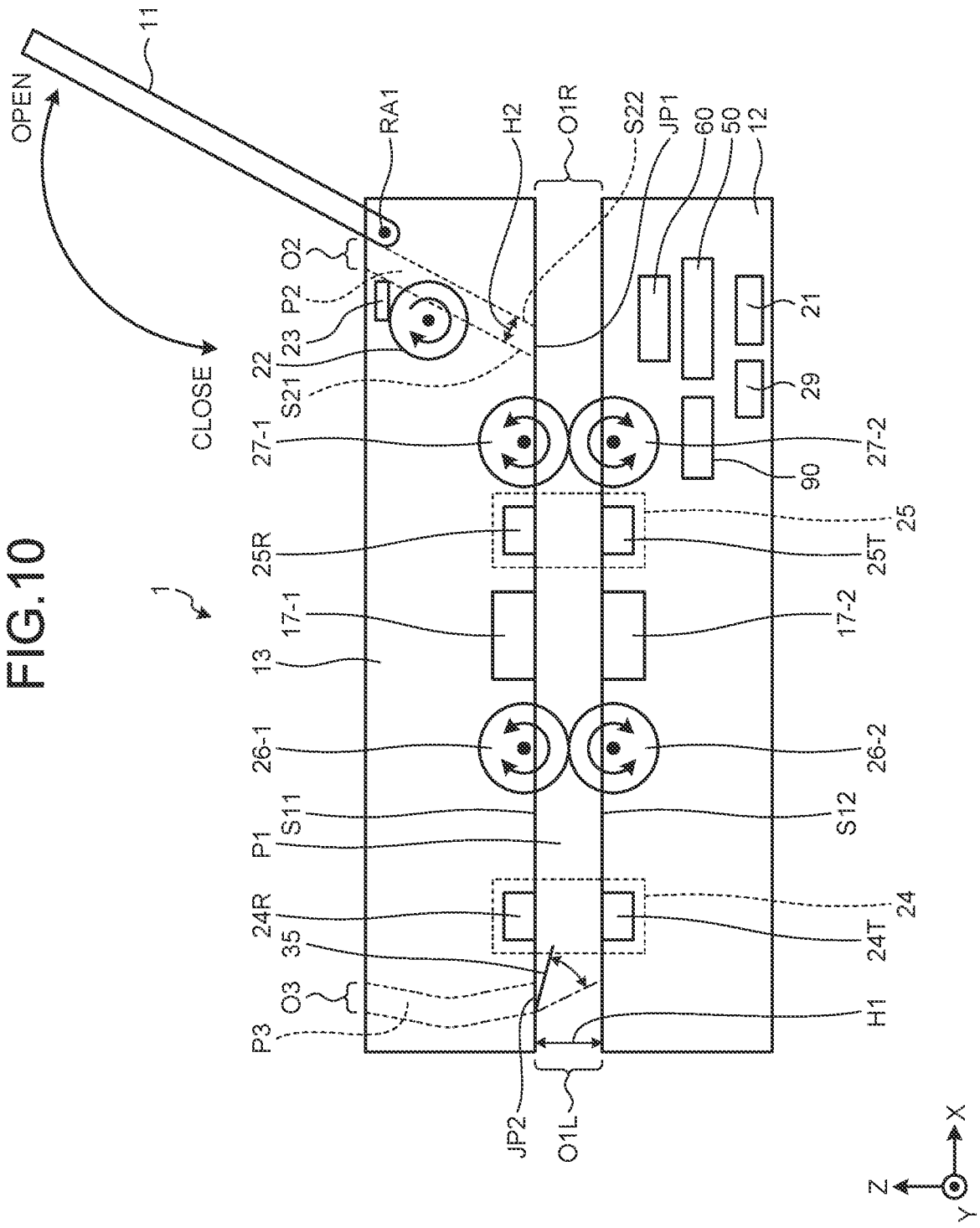
FIG. 10 is a diagram illustrating a configuration example of a scanner of a second embodiment of the disclosure.

FIG. 10 is a diagram illustrating a configuration example of a scanner of a second embodiment of the disclosure. Illustrated in FIG. 10 is a side view. The second embodiment is different from the first embodiment in that a scanner 1 further includes a light projection amount adjuster 90.

Configuration of Light Projection Amount Adjuster

Figure 11:
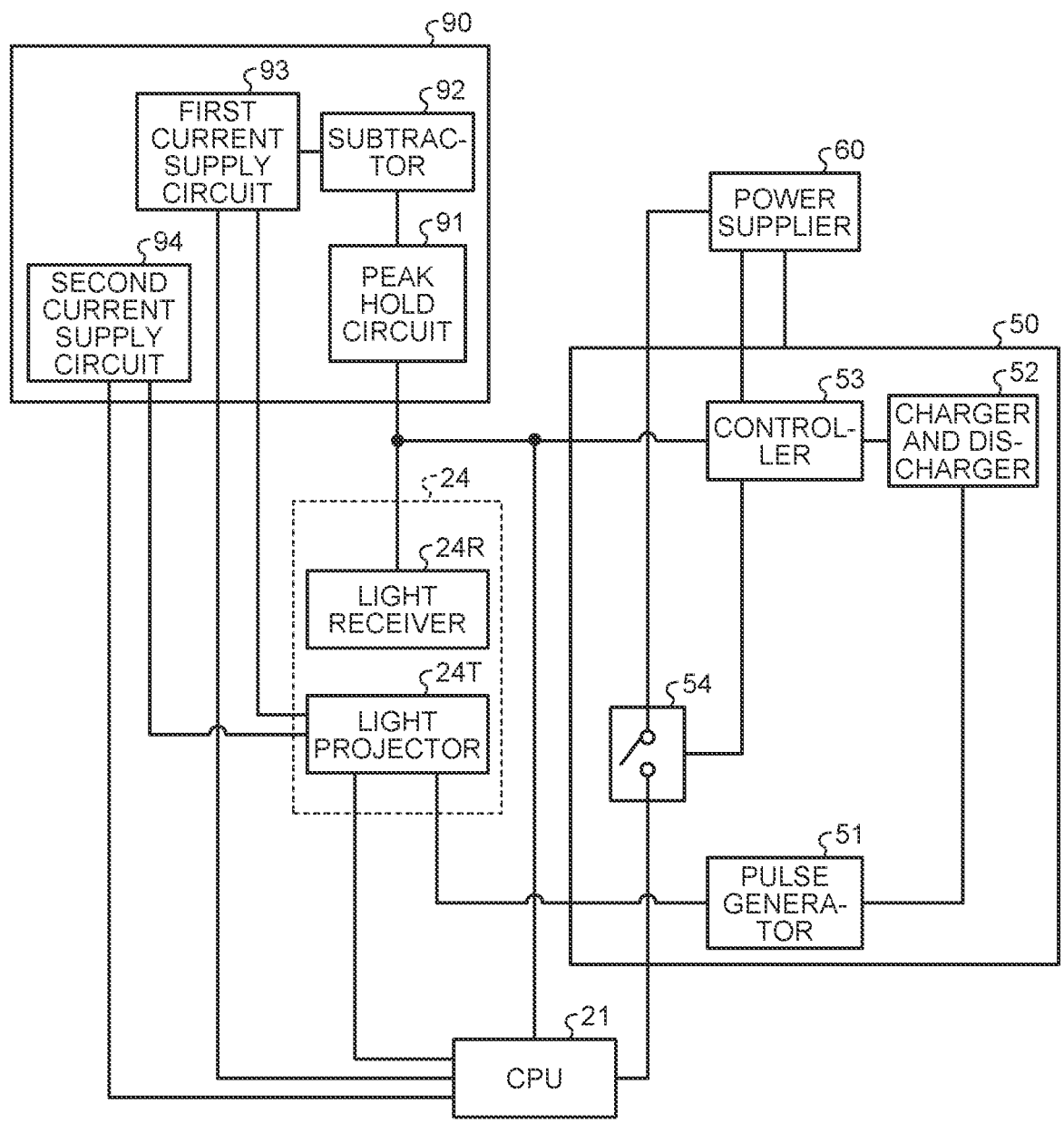
FIG. 11 is a diagram illustrating a configuration example of a light projection amount adjuster of the second embodiment of the disclosure.

FIG. 11 is a diagram illustrating a configuration example of the light projection amount adjuster of the second embodiment of the disclosure. In FIG. 11, the light projection amount adjuster 90 includes a peak hold circuit 91, a subtractor 92, a first current supply circuit 93, and a second current supply circuit 94.

The peak hold circuit 91 includes a resistor and a capacitor and holds a peak value (hereinafter also referred to as a "light reception peak value") of a voltage value (hereinafter also referred to as a "light reception voltage value") indicating the first light reception amount when the scanner 1 is in the sleep mode.

When the scanner 1 is in the sleep mode, the subtractor 92 calculates a differential value between the light reception peak value and the light reception reference value (hereinafter also referred to as a "light reception differential value") by subtracting a reference value of the light reception peak value (hereinafter also referred to as a "light reception reference value") from the light reception peak value. The light reception reference value is set in advance on the basis of a target value of the light reception voltage value (hereinafter also referred to as a "light reception target value"). For example, in a case where the light reception target value is 1.2 [V], the light reception reference value is set to 1.0 [V] which is smaller than the light reception target value on the basis of the resistance value or the capacitance of the resistor and the capacitor included in the peak hold circuit 91.

The first current supply circuit 93 adjusts the light projection amount of the pulsed light projected from the light projector 24T by adjusting the current supplied from the first current supply circuit 93 to the light projector 24T (hereinafter also referred to as a "first supply current") on the basis of the light reception differential value when the scanner 1 is in the sleep mode. The light projection amount in the light projector 24T increases when the first supply current increases, and the light projection amount in the light projector 24T decreases when the first supply current decreases. For example, the first current supply circuit 93 increases the first supply current by 8 [mA] when the light reception differential value is −0.2 [V] and decreases the first supply current by 8 [mA] when the light reception differential value is +0.2 [V].

The second current supply circuit 94 adjusts the light projection amount of the pulsed light projected from the light projector 24T by adjusting the current supplied from the second current supply circuit 94 to the light projector 24T (hereinafter also referred to as a "second supply current") in accordance with the control by the CPU 21 when the scanner 1 is in the operation mode. The light projection amount in the light projector 24T increases when the second supply current increases, and the light projection amount in the light projector 24T decreases when the second supply current decreases.

Processing Procedure in Scanner

Figure 12:
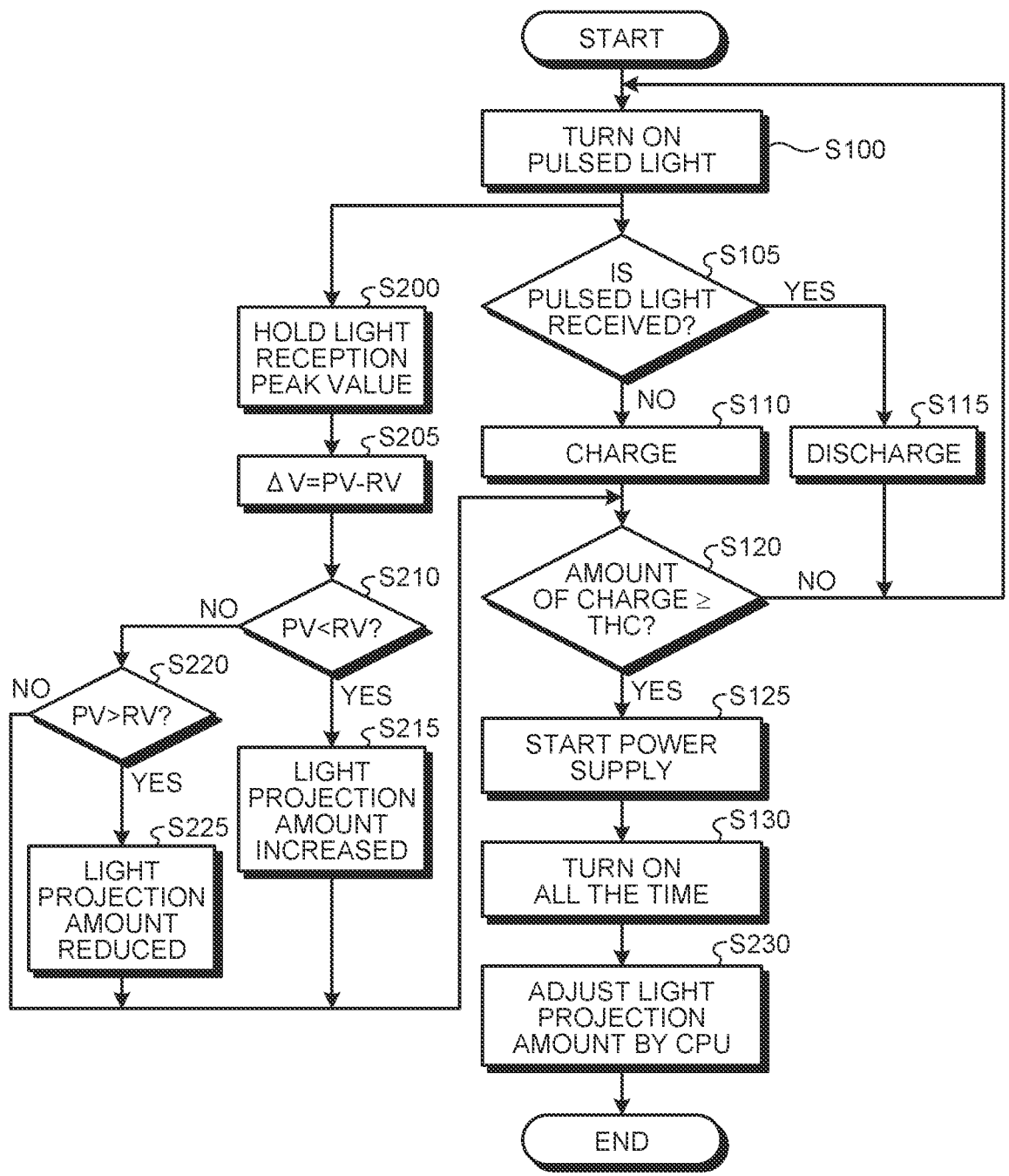
FIG. 12 is a flowchart illustrating an example of a processing procedure performed by the scanner of the second embodiment of the disclosure.

FIG. 12 is a flowchart illustrating an example of a processing procedure performed by the scanner of the second embodiment of the disclosure. The flowchart illustrated in FIG. 12 is started when the scanner 1 is in the sleep mode like in the first embodiment. Of the processing in the flowchart illustrated in FIG. 12, description of the same processing as that in the flowchart illustrated in FIG. 7 will be omitted.

After the processing of step S100, in step S200, the peak hold circuit 91 holds the light reception peak value PV [V].

Next, in step S205, the subtractor 92 calculates a light reception differential value ΔV [V] by subtracting a light reception reference value RV [V] from the light reception peak value PV.

Next, in step S210, the first current supply circuit 93 determines whether or not the light reception peak value PV is smaller than the light reception reference value RV. In a case where the light reception differential value ΔV is a negative value, the first current supply circuit 93 determines that the light reception peak value PV is smaller than the light reception reference value RV. If the light reception peak value PV is smaller than light reception reference value RV (step S210: Yes), the processing proceeds to step S215. If the light reception peak value PV is greater than or equal to the light reception reference value RV (step S210: No), the processing proceeds to step S220.

In step S215, the first current supply circuit 93 increases the light projection amount of the pulsed light projected from the light projector 24T by increasing the first supply current. After the processing of step S215, the processing proceeds to step S120.

On the other hand, in step S220, the first current supply circuit 93 determines whether or not the light reception peak value PV is larger than the light reception reference value RV. If the light reception differential value ΔV is a positive value, the first current supply circuit 93 determines that the light reception peak value PV is larger than the light reception reference value RV. If the light reception peak value PV is larger than the light reception reference value RV (step S220: Yes), the processing proceeds to step S225. If the light reception peak value PV is equal to the light reception reference value RV (step S210: No, step S220: No), the processing in steps S215 and S225 is not performed, and the processing proceeds to step S120.

In step S225, the first current supply circuit 93 decreases the light projection amount of the pulsed light projected from the light projector 24T by decreasing the first supply current. After the processing of step S225, the processing proceeds to step S120.

After the processing of step S130, in step S230, the CPU 21 stops the light projection amount adjustment based on the light reception peak value while performing the light projection amount adjustment based on the light reception voltage value [V] by stopping the operation of the first current supply circuit 93 while starting the operation of the second current supply circuit 94. That is, the CPU 21 stops the light projection amount adjustment based on the light reception peak value when the power supply from the power supplier 60 to the CPU 21 is started in step S125 and performs the light projection amount adjustment based on the light reception voltage value after the power supply from the power supplier 60 to the CPU 21 is started. In a case where the light reception voltage value is smaller than the light reception target value TV [V], the CPU 21 increases the second supply current by an amount corresponding to the absolute value of the difference between the light reception voltage value and the light reception target value TV, thereby increasing the light projection amount of the light projected from the light projector 24T. On the other hand, in a case where the light reception voltage value is larger than the light reception target value TV, the CPU 21 reduces the second supply current by an amount corresponding to the absolute value of the difference between the light reception voltage value and the light reception target value TV, thereby reducing the light projection amount of the light projected from the light projector 24T. After the processing of step S230, the processing procedure ends.

Operation of Scanner

Figure 13:
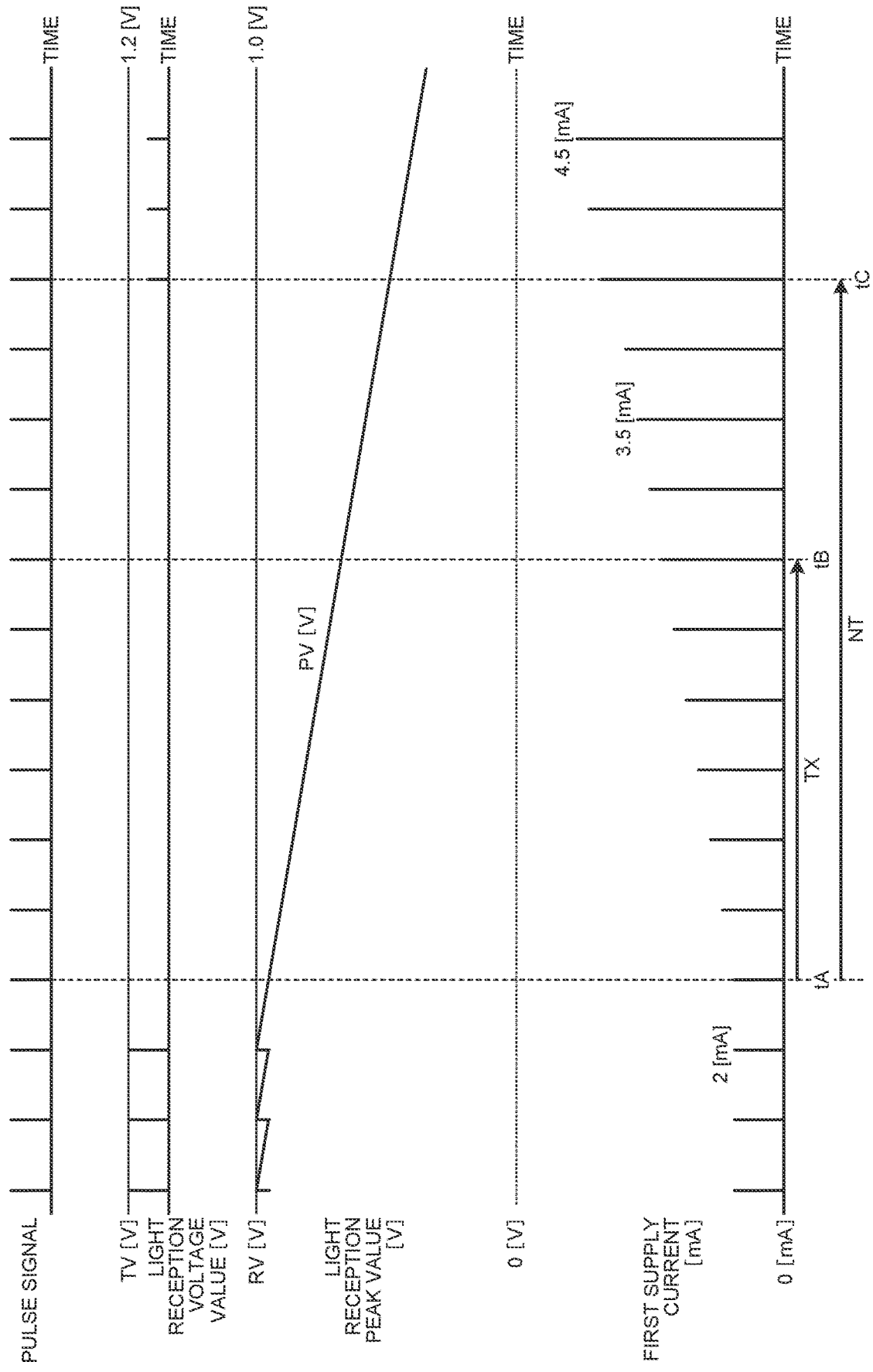
FIG. 13 is a diagram for explaining an operation example of the scanner of the second embodiment of the disclosure.

FIGS. 13 and 14 are diagrams for explaining an operation example of the scanner of the second embodiment of the present disclosure. Illustrated in FIG. 13 is a case where the light reception peak value PV is smaller than the light reception reference value RV (hereinafter also referred to as "case C3"), and illustrated in FIG. 14 is a case where the light reception peak value PV is larger than the light reception reference value RV (hereinafter also referred to as "case C4"). Hereinafter, an operation example of the scanner 1 will be described separately for case C3 and case C4.

Case C3 (FIG. 13)

When a first reading target medium is inserted into the conveyance path P1 from the opening O1L in the +X direction (rightward direction in the drawing) at the timing tA, the pulsed light projected from the light projector 24T is blocked by the first reading target medium, and thus the light reception voltage value that has been at the light reception target value TV decreases to 0. Therefore, the light reception peak value PV gradually decreases in accordance with self-discharge from the capacitor included in the peak hold circuit 91. In addition, the first supply current gradually increases as the light reception peak value PV gradually decreases. However, since a first supply current of 4.0 [mA] is required for the pulsed light projected from the light projector 24T to pass through the first reading target medium, no light reception voltage value appears until the first supply current reaches 4.0 [mA]. In addition, since the speed of self-discharge from the capacitor included in the peak hold circuit 91 is slow, it takes a considerable time for the light reception voltage value to exceed the light reception peak value PV even after the first supply current reaches 4.0 [mA]. Therefore, even after the first supply current reaches 4.0 [mA] and the light reception voltage value appears, the light reception peak value PV continues to decrease for a while until the light reception voltage value reaches the light reception target value TV.

As described above, when the first reading target medium is inserted during the light projection amount adjustment based on the light reception peak value, it is possible to ensure the time from the timing tA, which is the time point of insertion of the first reading target medium, to timing tC, which is the time point of transmission of the pulsed light through the first reading target medium (hereinafter also referred to as "non-transmission time"). Meanwhile, the timing tA in FIG. 13 corresponds to the timing t7 in FIG. 9, and the timing tB in FIG. 13 corresponds to the timing t13 in FIG. 9. As described above, at the timing t13, the controller 53 determines that the first reading target medium is present in the conveyance path P1.

Since the non-transmission time NT from the timing tA to the timing tC can be ensured, it is possible to prevent the first light reception level from becoming the high level H even though the first reading target medium is inserted in a period TX from the timing tA (timing t7) to the timing tB (timing t13) even in a case where the light reception voltage value increases due to the light projection amount adjustment based on the light reception peak value. Therefore, in the first embodiment, it is possible to prevent erroneous determination that no first reading target medium is inserted even though a first reading target medium is inserted.

Case C4 (FIG. 14)

In a case where a commercial power source is connected to the scanner 1 at timing tD, the light reception voltage value increases at the timing tD, and thus the light reception peak value PV becomes larger than the light reception reference value RV. Therefore, the first supply current decreases in accordance with the light reception differential value ΔV, and the light reception voltage value decreases as the first supply current decreases.

Here, since the amount of charge accumulated per pulse signal the capacitor included in the peak hold circuit 91 is small, the light reception voltage value that becomes smaller than the light reception target value TV at the timing tD returns to the light reception target value TV when the light reception peak value PV becomes smaller than the light reception reference value RV a plurality of times.

The above is the description of the second embodiment.

Third Embodiment

All or a part of pieces of the processing in the above description of the CPU 21 may be implemented by causing the CPU 21 to execute a program corresponding to each piece of the processing. For example, a program corresponding to each piece of the processing in the above description may be stored in the memory 29, and the program may be read from the memory 29 and executed by the CPU 21. Alternatively, the program may be stored in a program server connected to the scanner 1 via any network, downloaded from the program server to the scanner 1, and executed or may be stored in a recording medium readable by the scanner 1, read from the recording medium, and executed. Examples of the recording medium readable by the scanner 1 include a portable storage medium such as a memory card, a USB memory, an SD card, a flexible disk, a magneto-optical disk, a CD-ROM, a DVD, and a Blu-ray (registered trademark) disc. Meanwhile, the program is a data processing method described in any language or any description method and may be in any format such as a source code or a binary code. In addition, the program is not necessarily limited to programs configured solely but also includes those configured in a distributed manner as a plurality of modules or a plurality of libraries as well as those that achieve functions thereof in cooperation with a separate program, typically, an OS.

The above is the description of the third embodiment.

As described above, an image reading apparatus (scanner 1 of the embodiments) of the present disclosure includes a conveyance path (conveyance path P1 of the embodiments), a generator (pulse generator 51 of the embodiments), a sensor (transmissive optical sensor 24 of the embodiments), a peak hold circuit (peak hold circuit 91 of the embodiments), and a current supply circuit (first current supply circuit 93 of the embodiments). On the conveyance path, a medium to be read is conveyed. The generator generates a pulse signal. The sensor includes a light projector (light projector 24T of the embodiments) that projects pulsed light corresponding to the pulse signal toward the conveyance path and a light receiver (light receiver 24R of the embodiments) arranged so as to face the light projector across the conveyance path. The peak hold circuit holds a peak value of a light reception voltage value indicating the light reception amount of the pulsed light in the light receiver. When the peak value is smaller than the reference value, the current supply circuit increases the current supplied to the light projector, thereby increasing the light projection amount of the pulsed light projected from the light projector. Moreover, when the peak value is larger than the reference value, the current supply circuit reduces the current supplied to the light projector, thereby reducing the light projection amount of the pulsed light projected from the light projector.

With this configuration, the light projection amount can be adjusted without using a CPU.

The image reading apparatus (scanner 1 of the embodiments) of the present disclosure further includes a CPU (CPU 21 of the embodiments), a charger and discharger (charger and discharger 52 of the embodiments), and a controller (controller 53 of the embodiments). The charger and discharger can accumulate the charge of a pulse signal and release the accumulated charge. The controller causes the charger and discharger to release the charge when the pulsed light is received by the light receiver and causes the charger and discharger to accumulate the charge when the pulsed light is not received by the light receiver due to blockage of the pulsed light by the medium. In addition, the controller starts the power supply to the CPU at the time when the amount of charge accumulated in the charger and discharger becomes equal to or larger than a threshold value. The light projector projects the pulsed light before the power supply to the CPU is started and is turned on all the time after the power supply to the CPU is started. The CPU stops the light projection amount adjustment based on the peak value when the power supply to the CPU is started. Furthermore, after the power supply to the CPU is started, the CPU adjusts the light projection amount of the pulsed light projected from the light projector on the basis of the light reception voltage value.

In this manner, since the light projection amount is adjusted using the CPU after the power supply to the CPU has been started, the degree of freedom of the light projection amount adjustment after the power supply to the CPU is started can be increased as compared with that before the power supply to the CPU is started.

According to the disclosed technology, it is possible to adjust the light projection amount without using a CPU.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
    a conveyance path on which a medium to be read is conveyed;
    a generator that generates a pulse signal;
    a sensor comprising a light projector that projects pulsed light corresponding to the pulse signal toward the conveyance path and a light receiver disposed so as to face the light projector across the conveyance path;
    a peak hold circuit that holds a peak value of a voltage value indicating a light reception amount of the pulsed light in the light receiver; and
    a current supply circuit that performs light projection amount adjustment of increasing a light projection amount of the pulsed light projected from the light projector by increasing a current supplied to the light projector when the peak value is smaller than a reference value and decreasing the light projection amount by decreasing the current when the peak value is larger than the reference value.

2. The image reading apparatus according to claim 1, further comprising:
    a CPU;
    a charger and discharger capable of accumulating charge of the pulse signal and discharging the accumulated charge; and
    a controller that causes the charger and discharger to discharge the charge when the pulsed light is received by the light receiver and causes the charger and discharger to store the charge when the pulsed light is not received by the light receiver due to blockage of the pulsed light by the medium and starts power supply to the CPU at a time point when an amount of the charge stored in the charger and discharger becomes equal to or larger than a threshold value,
    wherein the light projector projects the pulsed light before the power supply to the CPU is started and, after the power supply to the CPU is started, is turned on all the time, and
    the CPU stops the light projection amount adjustment based on the peak value when the power supply to the CPU is started and, after the power supply to the CPU is started, adjusts the light projection amount on a basis of the voltage value.

3. An electronic device comprising:
    a generator that Generates a pulse signal;
    a sensor comprising a light projector that projects pulsed light corresponding to the pulse signal and a light receiver disposed so as to face the light projector;
    a peak hold circuit that holds a peak value of a voltage value indicating a light reception amount of the pulsed light in the light receiver; and
    a current supply circuit that increases a light projection amount of the pulsed light projected from the light projector by increasing a current supplied to the light projector when the peak value is smaller than a reference value and decreases the light projection amount by decreasing the current when the peak value is larger than the reference value.

4. A control method of an electronic device, the electronic device comprising:
    a generator that generates a pulse signal;
    a sensor comprising a light projector that projects pulsed light corresponding to the pulse signal and a light receiver disposed so as to face the light projector; and a peak hold circuit that holds a peak value of a voltage value indicating a light reception amount of the pulsed light in the light receiver, the control method comprising the steps of:

increasing a light projection amount of the pulsed light projected from the light projector when the peak value is smaller than a reference value and decreasing the light projection amount when the peak value is larger than the reference value.

\* \* \* \* \*